(12) United States Patent
Huh et al.

(10) Patent No.: US 11,911,853 B2
(45) Date of Patent: Feb. 27, 2024

(54) WELDING INFORMATION PROVIDING APPARATUS WITH FUNCTION OF SENSING ENVIRONMENT

(71) Applicant: OTOS WING.CO., LTD., Seoul (KR)

(72) Inventors: Moon Young Huh, Seoul (KR); Sung Won Huh, Seoul (KR)

(73) Assignee: OTOS WING.CO., LTD., Seoul (KR)

( * ) Notice: Subject to any disclaimer, the term of this patent is extended or adjusted under 35 U.S.C. 154(b) by 573 days.

(21) Appl. No.: 17/025,580

(22) Filed: Sep. 18, 2020

(65) Prior Publication Data

US 2021/0086310 A1 Mar. 25, 2021

(30) Foreign Application Priority Data

Sep. 20, 2019 (KR) .................. 10-2019-0116351

(51) Int. Cl.
  *B23K 31/02* (2006.01)
  *H04N 7/18* (2006.01)
  *B23K 37/00* (2006.01)

(52) U.S. Cl.
  CPC .............. *B23K 31/02* (2013.01); *B23K 37/00* (2013.01); *H04N 7/181* (2013.01)

(58) Field of Classification Search
  CPC ......... B23K 31/02; B23K 37/00; H04N 7/181
  USPC ....................................... 219/148
  See application file for complete search history.

(56) References Cited

U.S. PATENT DOCUMENTS

| 6,710,298 | B2 * | 3/2004 | Eriksson .................. A61F 9/06 348/E7.086 |
| 8,502,866 | B2 * | 8/2013 | Becker .................. H04N 7/183 345/9 |
| 2005/0168569 | A1 | 8/2005 | Igarashi et al. |
| 2010/0224610 | A1 | 9/2010 | Wallace |
| 2013/0206741 | A1 * | 8/2013 | Pfeifer .................. G01S 17/58 356/28 |
| 2013/0242110 | A1 | 9/2013 | Terre et al. |
| 2015/0379894 | A1 | 12/2015 | Becker et al. |
| 2016/0125653 | A1 | 5/2016 | Denis |

(Continued)

FOREIGN PATENT DOCUMENTS

| CN | 108701428 A | 10/2018 |
| EP | 3 268 949 B1 | 5/2021 |

(Continued)

OTHER PUBLICATIONS

Decision of Rejection for Chinese Application 202010956408.1 dated Feb. 1, 2023, all pages.

(Continued)

*Primary Examiner* — Tu B Hoang
*Assistant Examiner* — Thomas J Ward
(74) *Attorney, Agent, or Firm* — Kilpatrick Townsend & Stockton LLP

(57) ABSTRACT

Provided is a welding information providing apparatus capable of providing a high-definition image allowing easy identification of welding surroundings in addition to a portion adjacent to welding light by synthesizing photographs taken through various imaging conditions; improving welding quality by providing efficient guiding to the worker regarding a current welding status; checking what is happening in the surroundings even during a welding operation; and easily performing welding even in an environment where it is difficult to perform welding.

4 Claims, 18 Drawing Sheets

(56) References Cited

U.S. PATENT DOCUMENTS

| | | |
|---|---|---|
| 2016/0260261 A1 | 9/2016 | Hsu |
| 2018/0130226 A1 | 5/2018 | Meess et al. |
| 2018/0130376 A1 | 5/2018 | Meess et al. |
| 2018/0308385 A1 | 10/2018 | Sommers et al. |

FOREIGN PATENT DOCUMENTS

| | | |
|---|---|---|
| KR | 2018-0101201 A | 9/2018 |
| KR | 2019-0029288 A | 3/2019 |
| WO | 2005/102230 A1 | 11/2005 |
| WO | 2009/146359 A1 | 12/2009 |

OTHER PUBLICATIONS

Office Action for Chinese Application 202010956408.1 dated Oct. 25, 2021, all pages.
Office Action for Chinese Application 202010956408.1 dated May 30, 2022, all pages.
Office Action for Chinese Application 202010956408.1 dated Oct. 17, 2022, all pages.
Written Opinion on the Brevetability of the Invention for FR2009386 filed Sep. 16, 2020, all pages.
French Preliminary Search Report for FR2009386 dated Dec. 15, 2021, all pages.
French Preliminary Search Report—Response to the Patent Office for dated May 10, 2022, all pages.

\* cited by examiner

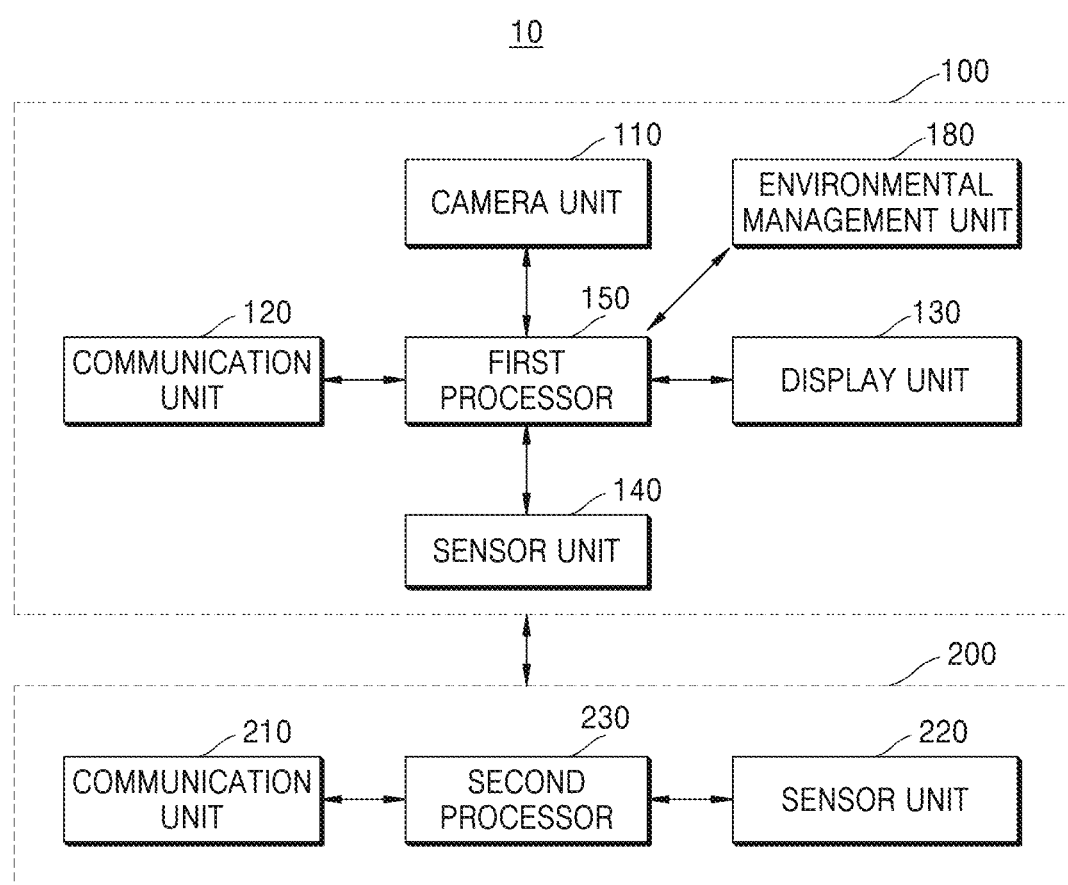

WELDING INFORMATION PROVIDING APPARATUS WITH FUNCTION OF SENSING ENVIRONMENT

CROSS-REFERENCE TO RELATED APPLICATION

This application claims priority to Korean Patent Application No. 10-2019-0116351, filed on Sep. 20, 2019, in the Korean Intellectual Property Office, the disclosure of which is incorporated herein in its entirety by reference.

BACKGROUND

1. Field

One or more embodiments relate to a welding information providing apparatus.

2. Description of the Related Art

Protective gear is worn by a worker for protection from light and high amounts of heat generated during a welding process. Because the worker may only check the welding process through the protective gear while wearing the protective gear, in order to check a variety of information about welding, such as conditions set in a welding device, the worker has the hassle of having to remove their protective gear and carry out a visual check.

When the worker's skill level is not high, especially when an automatic welding surface and a manual welding surface are worn, the worker may see only a portion adjacent to the welding light, and it is difficult to recognize a specific welding situation such as the surroundings of the welding. Accordingly, it is necessary to provide the worker with a high-definition image that allows the welding surroundings to be visually checked, and provide the worker with specific information about welding status information.

In addition, the worker is vulnerable to a variety of surrounding information that changes in a welding environment due to the above-described protective gear, which makes work difficult for the worker and puts the worker at risk.

As well as in a welding operation, the same problems as mentioned above are caused for medical staff during a skin operation and/or medical treatment using a camera image, and also when working with other camera images.

SUMMARY

One or more embodiments include a welding information providing apparatus capable of showing welding surroundings as well as a welding spot to a worker to improve welding accuracy of the worker and to perform smooth welding.

One or more embodiments include an apparatus for guiding information about welding status information to a worker.

One or more embodiments include a welding information providing apparatus capable of preventing a worker from being in danger by welding surroundings.

One or more embodiments include enabling a user to provide accurate information about surroundings in a work using a camera image.

However, this is merely an example, and the scope of the disclosure is not limited thereto.

Additional aspects will be set forth in part in the description which follows and, in part, will be apparent from the description, or may be learned by practice of the presented embodiments of the disclosure.

According to one or more embodiments, a welding information providing apparatus includes a main body provided to be worn by a user, a display unit arranged on the main body and including a portion facing the user, at least one camera unit facing the outside of the main body and obtaining a welding image frame for welding work, an environmental management unit provided to face the outside of the main body and obtain changing information about a welding environment, and a processor provided to operatively communicate with the display unit, the camera unit, a sensor unit, and the environmental management unit, and to provide the welding image frame toward a portion facing the user of the display unit.

The sensor unit may include a module configured to detect welding information, and the processor may control the display unit to provide guiding corresponding to the welding information based on the welding information detected through the sensor unit.

At least a portion of the sensor unit may be located on a welding torch.

The welding information may include at least one of welding speed information, welding direction information, welding temperature information, and distance information between a welding base material and the welding torch.

The environmental management unit is located at a different location from that of the camera unit, and may provide image information about the welding environment.

The processor may be configured to display, on the display unit, image information obtained from the environmental management unit.

These and/or other aspects will become apparent and more readily appreciated from the following description of the embodiments, taken in conjunction with the accompanying drawings.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a block diagram for explaining components of a welding system according to an embodiment;

DETAILED DESCRIPTION

Figure 1:
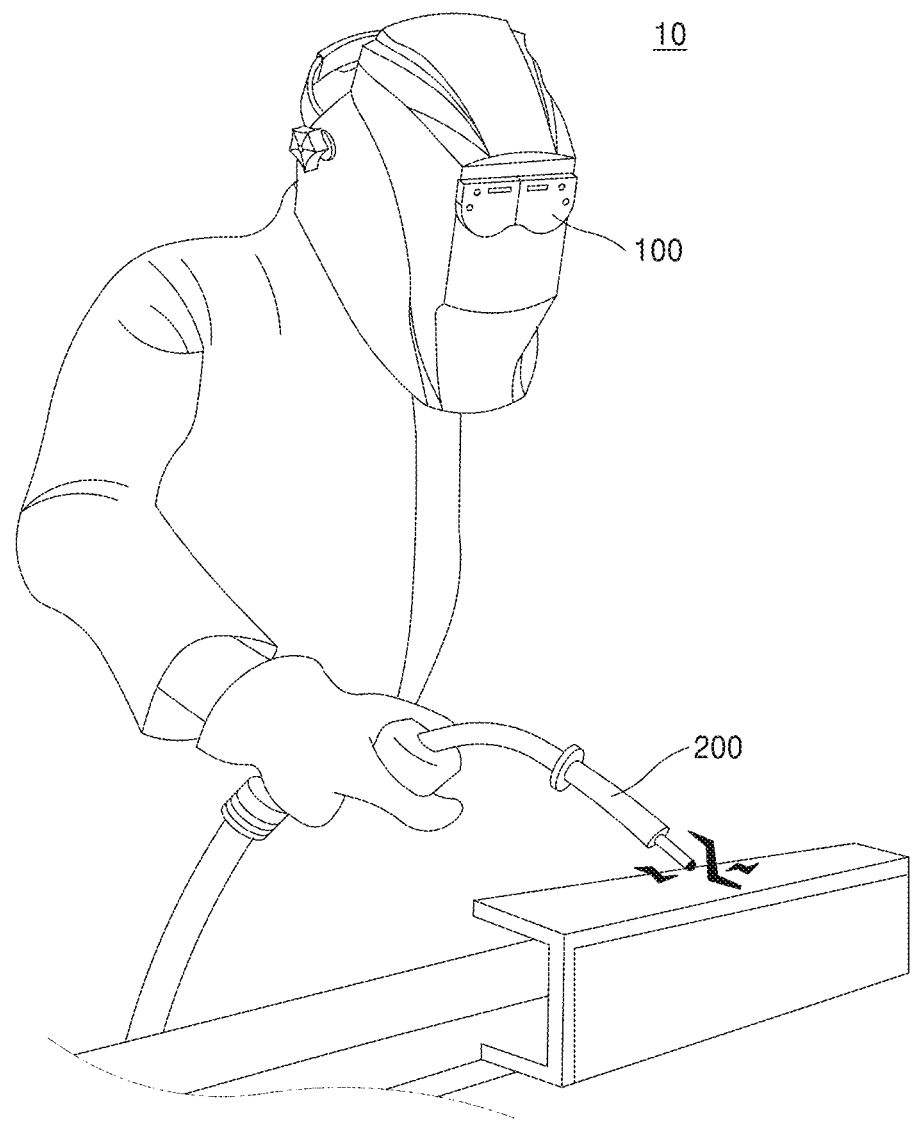
FIG. 1 is a view for explaining a structure of a welding system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments of the disclosure are described in connection with the accompanying drawings. Various embodiments of the disclosure may have various modifications and various embodiments, and specific embodiments are illustrated in the drawings and related detailed descriptions are described. However, this is not intended to limit the various embodiments of the disclosure to specific embodiments, and should be understood to include all modifications and/or equivalents or substitutes included in the spirit and technical scope of the various embodiments of the disclosure. Similar reference numerals are assigned to similar elements throughout the specification.

Expressions such as "include" or "may include" that may be used in various embodiments refer to corresponding functions, operations, or components, etc. disclosed, and do not limit additional one or more functions, operations, or components. Also, it will be further understood that the terms "comprises" and/or "comprising" when used in various embodiments of the disclosure, specify the presence of stated features, integers, steps, operations, elements, and/or components, but do not preclude the presence or addition of one or more other features, integers, steps, operations, elements, components, and/or groups thereof.

It will be understood that although the terms "first", "second", "third", etc. may be used herein to describe various components, these components should not be limited by these terms. For example, the above terms do not limit the order and/or significance of the components. The above terms may be used to distinguish one component from another component. For example, a first user device and a second user device are both user devices and are different from each other. For example, a first element could be termed a second element without departing from the teachings of the disclosure, and similarly, the second element could also be termed the first element.

Further, if it is described that one element is "connected" or "accesses" the other element, it is understood that the one element may be directly connected to or may directly access the other element but unless explicitly described to the contrary, another element may be "connected" or "access" between the elements. However, if it is described that one element is "directly connected" or "directly accesses" the other element, it is understood that there are no other elements exists between them.

In the embodiments of the disclosure, terms such as "unit", "part", and the like are used to refer to a component that performs at least one function or operation, and the component may be implemented by hardware or software or a combination of hardware and software. In addition, a plurality of "units", "parts", and the like may be implemented as at least one processor by being integrated with at least one module or chip, except where each needs to be implemented as individual specific hardware.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, various embodiments of the disclosure will be described in detail with reference to the accompanying drawings.

FIG. 1 is a view for explaining a structure of a welding system 10 according to an embodiment.

Referring to FIG. 1, the welding system 10 of the disclosure may include a welding information providing apparatus 100 and a welding torch 200. The welding information providing apparatus 100 and the welding torch 200 may be connected to each other through a communication network to transmit and receive data. The welding information providing apparatus 100 and the welding torch 200 may be operated by one-to-one matching, but are not limited thereto, and one-to-n matching is also possible. That is, n welding torches 200 may be connected to one welding information providing apparatus 100, and one welding torch 200 may be connected to n welding information providing apparatuses 100. In addition, the welding information providing apparatus 100 and the welding torch 200 may communicate with separate servers (not shown) to exchange data.

The welding information providing apparatus 100 may provide information about a welding situation to a worker. In more detail, the welding information providing apparatus 100 obtains a welding image obtained by using at least one camera unit mounted on the welding information providing apparatus 100, and may generate a composite image based on the welding image and display the composite image to the worker. At this time, the welding information providing apparatus 100 may generate a synthesized image by using High Dynamic Range (HDR) technology, and may display and provide a high-definition synthesized image to a worker. At this time, the worker may visually check information about the shape of a welding bead and surroundings in a portion other than the portion adjacent to welding light through the high-definition synthesized image.

In order to synthesize and provide a high-definition welding image, the welding information providing apparatus 100 according to an embodiment may obtain images through two or more camera units and display each image through at least one display unit. At this time, the welding information providing apparatus 100 may synthesize images by repeatedly capturing after setting the shutter speed, ISO sensitivity, and gain value of each camera differently. The welding information providing apparatus 100 according to an embodiment may improve image quality by processing a contrast ratio of the obtained synthesized image.

In addition, the welding information providing apparatus 100 of the disclosure may provide a function of displaying welding information in a preferred color (e.g., green, blue) using RGB. In addition, the welding information providing apparatus 100 of the disclosure may provide a function of correcting the number of magnifying glasses (e.g., zooming in and out of a screen). In addition, the welding information providing apparatus 100 of the disclosure may provide a temperature synthesis image by using a separate thermal imaging camera. At this time, the welding information providing apparatus 100 may display welding temperature in color. The welding information providing apparatus 100 of the disclosure may support a function of providing all the functions described above, as sound (e.g., guidance alarm) or guide voice.

The welding torch 200 according to an embodiment may detect a welding situation including welding temperature, a welding direction, a welding slope, welding speed, and a distance between a base material and a welding torch for real-time welding through at least one sensor. The welding torch 200 may monitor the state of a torch, and change a set value of a torch operation according to a welding situation.

The welding information providing apparatus 100 of the disclosure may receive information about work setting and a working status from the welding torch 200 through a communication network connected to the welding torch 200, and may provide work information to a worker through visual feedback based on the received welding information.

For example, when sensing information about a welding temperature value is received, the welding information providing apparatus 100 may output a notification corresponding to a temperature value in various ways such as light, vibration, and message. At this time, the notification may be visual feedback provided to the display unit of the welding information providing apparatus 100, or may be audible feedback through sound (e.g., guidance alarm) or guide voice.

Meanwhile, the sensing information about the welding temperature value may include information about whether the welding temperature value exceeds a preset temperature range. Further, the sensing information about the welding temperature value may include a numerical value, a grade, a level, and the like corresponding to a temperature value of a welding surface.

When the welding information providing apparatus 100 according to an embodiment determines that the temperature value of the torch and the welding surface is outside the preset temperature range, the welding information providing apparatus 100 may guide the worker to stop the work. In the case of welding outside the preset temperature range, there is a risk of deterioration in quality, and thus, the worker may be guided to adjust the temperature value of the torch.

When it is detected that a current or a voltage state of the welding torch 200 is abnormal, the welding information providing apparatus 100 according to an embodiment may provide visual feedback for warning.

At this time, the visual feedback may provide an icon indicating a danger to a portion of the display unit of the welding information providing apparatus 100 displaying a work site. As another example, the welding information providing apparatus 100 may provide guiding to stop work through visual feedback by repeatedly increasing and decreasing saturation fora specific color (e.g., red) on the entire screen of the display unit.

According to an embodiment, the welding information providing apparatus 100 may sense welding information through a sensor (e.g., a first sensor) included in the welding information providing apparatus 100 in addition to at least one sensor (e.g., a second sensor) included in the welding torch 200. At this time, the welding information may detect a welding situation including light intensity, welding temperature, a welding direction, a welding slope, welding speed, and a distance between a base material and a welding torch associated with real-time welding through at least one sensor.

Similarly, the welding information providing apparatus 100 may provide guiding corresponding to welding information based on welding information detected through a sensor (e.g., the first sensor) included in the welding information providing apparatus 100.

According to an embodiment, the welding information providing apparatus 100 may change the operation of the welding torch by sensing preset user's motion or preset user's voice after guiding for stopping the work is provided.

In another embodiment, when the communication with the welding torch 200 is not smooth, the welding information providing apparatus 100 may obtain the temperature value of the torch and the welding surface through image sensing provided by itself. For example, the welding information providing apparatus 100 may obtain temperature values of the torch and the welding surface based on image data obtained through a thermal imaging camera.

The above-described example only describes a case where the information received from the welding torch 200 is welding temperature information, and the welding information providing apparatus 100 may provide various guidings for a variety of welding information.

FIG. 2 is a block diagram for explaining components of the welding system 10 according to an embodiment.

Referring to FIG. 2, the welding system 10 may include the welding information providing apparatus 100 and the welding torch 200. The welding information providing apparatus 100 may include a camera unit 110, an environmental management unit 180, a communication unit 120, a display unit 130, a first processor 150, and a sensor unit 140, and the welding torch 200 may include a communication unit 210, a sensor unit 220, and a second processor 230.

The camera unit 110 may include at least one camera device, and may include a camera for photographing an image of a welding site. The camera unit 110 according to an embodiment may be a camera adjacent to the display unit 130 of the welding information providing apparatus 100. For example, a first camera and a second camera among cameras 110 may be symmetrically mounted on an area of a front portion of the welding information providing apparatus 100, respectively.

The camera unit 110 may receive a control command from the first processor 150 and change a setting of shutter speed, ISO sensitivity, GAIN, etc. in response to the control command to photograph the welding site. The camera unit 110 may include the first camera and the second camera, which may photograph the welding site through different capturing settings, respectively.

The camera unit 110 according to an embodiment may be included in one area of a front portion of the display unit 130, and may have a structure in which a light-shielding cartridge is located in front of a lens receiving light from a subject.

An automatic light-shielding cartridge may shield welding light generated when a worker performs welding. That is, the automatic light-shielding cartridge (not shown) may increase a light-shielding degree of the cartridge by blackening based on welding light information detected through the sensor 140, for example, a photo sensor. At this time, the automatic light-shielding cartridge may include, for example, a liquid crystal protection panel (LCD panel) in which the degree of blackening may be adjusted according to an alignment direction of a liquid crystal. However, the automatic light-shielding cartridge is not limited thereto, and may be implemented in various panels such as a vertical alignment (VA) type LCD, a twisted nematic (TN) type LCD, and an in-plane switching (IPS) type LCD.

The degree of blackening of the automatic light-shielding cartridge may be automatically adjusted according to the brightness of the welding light. As described above, when the degree of blackening of the automatic light-shielding cartridge is automatically adjusted according to the brightness of the welding light, the sensor unit 140 may be used. When the sensor unit 140 senses intensity of the welding light and obtains welding light information, and transmits information about the intensity of the welding light included in the welding light information as a certain electrical signal to the first processor 150 to be described later below, the first processor 150 may control the degree of blackening based on the intensity of the welding light.

That is, the automatic light-shielding cartridge (not shown) may change the light-shielding degree of a panel in real time to respond to the intensity of light generated on a welding surface at a welding site, and the camera unit 110 may photograph a welding image in which a certain amount of welding light is shielded by an automatic light-shielding cartridge installed on a front portion.

According to another embodiment of the disclosure, the welding information providing apparatus 100 may not include an automatic light-shielding cartridge. In this case, a user may perform welding only with a welding image obtained through the camera unit 110.

The camera unit 110 according to an embodiment may include a thermal imaging camera. The welding information providing apparatus 100 may obtain a temperature image by synthesizing a thermal image obtained through the thermal imaging camera to an image of a welding site.

According to an embodiment, the environmental management unit 180 connected to the first processor 150 so as to be communicative may be further included. The environmental management unit 180 is located outside the welding information providing apparatus 100 and is configured to obtain changing information about at least a welding area. For example, the environmental management unit 180 may provide image information about an area other than the welding area. Optionally, the environmental management unit 180 may provide image information about a welding area located in an environment in which welding work is difficult. More embodiments will be described later below.

The communication unit 120 is configured to receive welding information from the welding torch 200 and to transmit a command for controlling the welding torch 200. According to an embodiment, the communication unit 120 may transmit a synthesized image to an external device other than the welding torch 200. At this time, the external device may include various devices including a communication module such as a smartphone/computer of a worker/third party.

The communication unit 120 may be configured to perform communication with various types of external devices according to various types of communication methods. The communication unit 120 may include at least one of a Wi-Fi chip, a Bluetooth chip, a wireless communication chip, and an NFC chip. In particular, when a Wi-Fi chip or a Bluetooth chip is employed, various connection information, such as a service set identifier (SSID), a session key, etc., is transceived in advance. Then, communication is performed by using the connection information so as to transceive a variety of information. The wireless communication chip refers to a chip for performing communication according to various communication standards such as IEEE, ZigBee, 3rd generation (3G), 3rd generation partnership project (3GPP), or long-term evolution (LTE). The NFC chip refers to a chip that operates according to an NFC method by using 13.56 MHz, from among various RF-ID frequency bands such as 135 kHz, 13.56 MHz, 433 MHz, 860 to 960 MHz, 2.45 GHz, etc.

The display unit 130 is configured to provide a high-definition synthesized image to a worker. In more detail, the display unit 130 may be implemented in the form of goggles or glasses including a display that displays a synthesized image obtained by synthesizing an image obtained through the camera unit 110 to a worker.

According to an embodiment, a rear portion of the display unit 130, that is, a portion facing a worker may include a display for displaying a high-definition image to the worker and an eyepiece lens and an eyepiece portion for viewing the display.

The display included in the display unit 130 may display a high-definition synthesized image such that the worker may visually check surroundings other than a portion adjacent to welding light (e.g., the shape of a previously welded bead) In addition, the display unit 130 may guide a visual feedback (e.g., a welding progress direction) on a welding progress state to the worker.

The display included in the display unit 130 may be implemented with various display technologies such as Liquid Crystal Display (LCD), Organic Light Emitting Diodes (OLED), Light-Emitting Diode (LED), Liquid Crystal on Silicon (LcoS), or DLP (Digital Light Processing). At this time, a display according to an embodiment may be implemented with a panel of opaque material, and a worker may not be directly exposed to harmful light.

The sensor unit 140 may include a plurality of sensor modules configured to sense a variety of information about a welding site and obtain welding information. At this time, the welding information may include welding temperature, a welding direction, a welding slope, welding speed, and spacing between a base material and a welding torch associated with real-time welding. Moreover, the sensor unit 140 may include an optical sensor module configured to detect light intensity at least within a welding area.

According to an embodiment, the sensor unit 140 may include an illuminance sensor and obtain information about the intensity of welding light at the welding site. The sensor unit 140 may further include various types of sensors, such as a proximity sensor, a noise sensor, a video sensor, an ultrasonic sensor, and an RF sensor, in addition to the illuminance sensor, and may detect various changes related to a welding environment.

The first processor 150 may generate a high quality synthesized image by synthesizing a welding image received through the camera unit 110. The first processor 150 may set imaging conditions for each frame of the camera unit 110 differently, and synthesize frames obtained in chronological order in parallel to obtain a synthesized image. In more detail, the first processor 150 may control the camera unit 110 to shoot by changing shutter speed, ISO sensitivity, and GAIN of the camera unit 110.

In this case, the first processor 150 may set different imaging conditions according to conditions such as welding light, ambient light, and the degree of movement of the welding torch 200 at a sensed welding site. In more detail, the first processor 150 may set imaging conditions to reduce ISO sensitivity and GAIN as the welding light and/or ambient light at the welding site is higher. In addition, when it is sensed that movement and/or work speed of the welding torch 200 is fast, imaging conditions may be set to increase shutter speed.

The first processor 150 may synthesize images of a preset number of frames in parallel. According to an embodiment, respective images in a preset frame may be shot with different imaging conditions.

The first processor 150 according to an embodiment, when there are two or more camera units 110, may control to set and shoot differently imaging setting conditions of respective cameras units. Even in this case, the first processor 150 may synthesize images of a preset number of frames in parallel.

The first processor 150 may control the overall operation of the welding information providing apparatus 100 by using various programs stored in a memory (not shown). For example, the first processor 150 may include a central processing unit (CPU), RAM, ROM, and a system bus. Here, the ROM is a configuration in which an instruction set for system boot is stored, and the CPU copies an operating system stored in a memory of the welding information providing apparatus 100 into the RAM according to the instruction stored in the ROM, and executes O/S to boot the system. When the boot is completed, the CPU may perform various operations by copying and executing various applications stored in the memory in the RAM. In the above, the first processor 150 is described as including only one CPU, but may be implemented as a plurality of CPUs (or DSPs, SoCs, etc.).

According to an embodiment, the first processor 150 may be implemented as a digital signal processor (DSP) that processes digital signals, a microprocessor, and/or a time controller (TCON). However, the first processor 150 is not limited thereto, and may include one or more of a CPU, a micro controller unit (MCU), a micro processing unit (MPU), a controller, an application processor (AP), a communication processor (CP), and an advanced RISC machine (ARM) processor, or may be defined in a corresponding term. In addition, the first processor 150 may be implemented in the form of a system on chip (SoC) and a large scale integration (LSI) in which a processing algorithm is embedded, or may be implemented in the form of a field programmable gate array (FPGA).

The welding torch 200 may include the communication unit 210, the sensor unit 220, and the second processor 230.

The communication unit 210 transmits and receives data to and from the welding information providing apparatus 100. The communication unit 210 may include a module capable of short-range wireless communication (e.g., Bluetooth, Wifi, or Wifi-Direct) or remote wireless communication (3G, High-Speed Downlink Packet Access (HSDPA), or LTE).

The sensor unit 220 or a second sensor is included in the welding torch to sense a welding situation, such as welding temperature, welding speed, a welding slope, a welding direction, and a distance between a base and the welding torch.

The sensor unit 220 may detect at least one of various changes such as a posture change of a user gripping the welding torch 200, a change in roughness of a welding surface, and a change in acceleration of the welding torch 200, and may transmit an electrical signal corresponding thereto to the second processor 230. That is, the sensor unit 220 may detect a state change based on the welding torch 200, generate a detection signal accordingly, and transmit the detection signal to the second processor 230.

In the present disclosure, the sensor unit 220 may include various sensors, and power is supplied to at least one preset sensor according to control when driving the welding torch 200 (or based on user settings) to detect a change in the state of the welding torch 200.

In this case, the sensor unit 220 may include at least one device among all types of sensing devices capable of detecting a state change of the welding torch 200. For example, the sensor unit 220 may include at least one sensor among various sensing devices such as an acceleration sensor, a gyro sensor, an illuminance sensor, a proximity sensor, a pressure sensor, a noise sensor, a video sensor, and a gravity sensor. Light intensity in a welding area detected by the illuminance sensor of the welding torch 200 may be transmitted to the first processor 150 through the communication unit 210, and the first processor 150 may control the camera unit 110 based on the light intensity transmitted through the illuminance sensor of the welding torch 200 without passing through the sensor unit 140 of the welding information providing apparatus 100.

Meanwhile, the acceleration sensor is a component for detecting movement of the welding torch 200. In more detail, the acceleration sensor may measure a dynamic force of the welding torch 200, such as acceleration, vibration, and shock, and thus may measure the movement of the welding torch 200.

The gravity sensor is a component for detecting the direction of gravity. That is, a detection result of the gravity sensor may be used to determine the movement of the welding torch 200 together with the acceleration sensor. In addition, a direction in which the welding torch 200 is gripped may be determined through the gravity sensor.

In addition to the above-described types of sensors, the welding torch 200 may further include various types of sensors, such as a gyroscope sensor, a geomagnetic sensor, an ultrasonic sensor, and an RF sensor, and may detect various changes related to a welding environment.

Figure 3A:
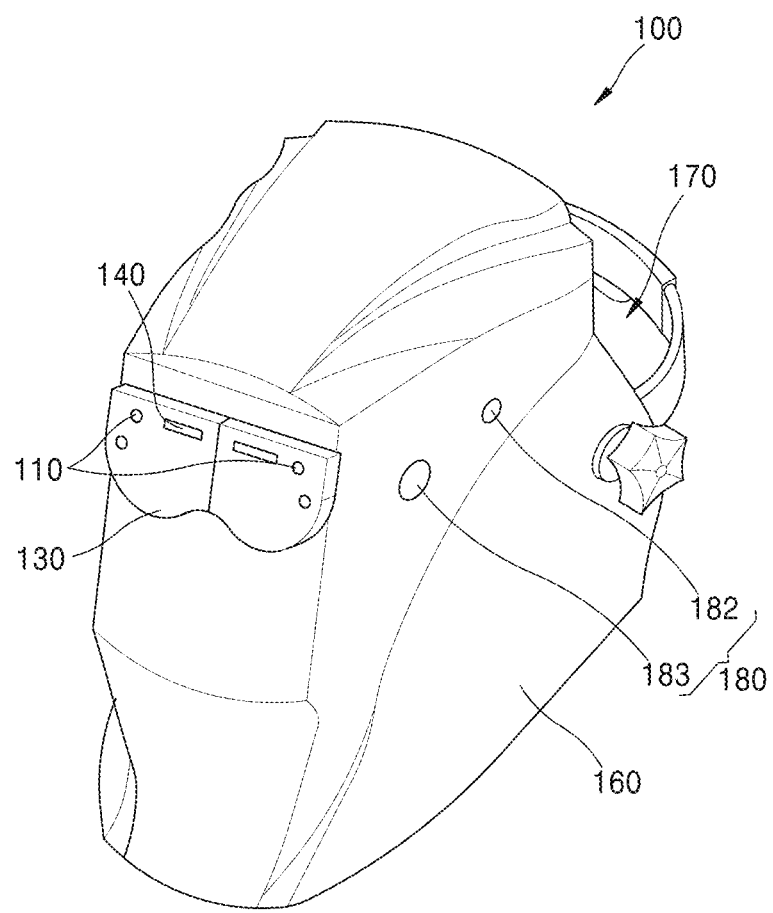
FIGS. 3A and 3B are perspective views illustrating a welding information providing apparatus equipped with a plurality of cameras according to different embodiments.
Figure 3B:
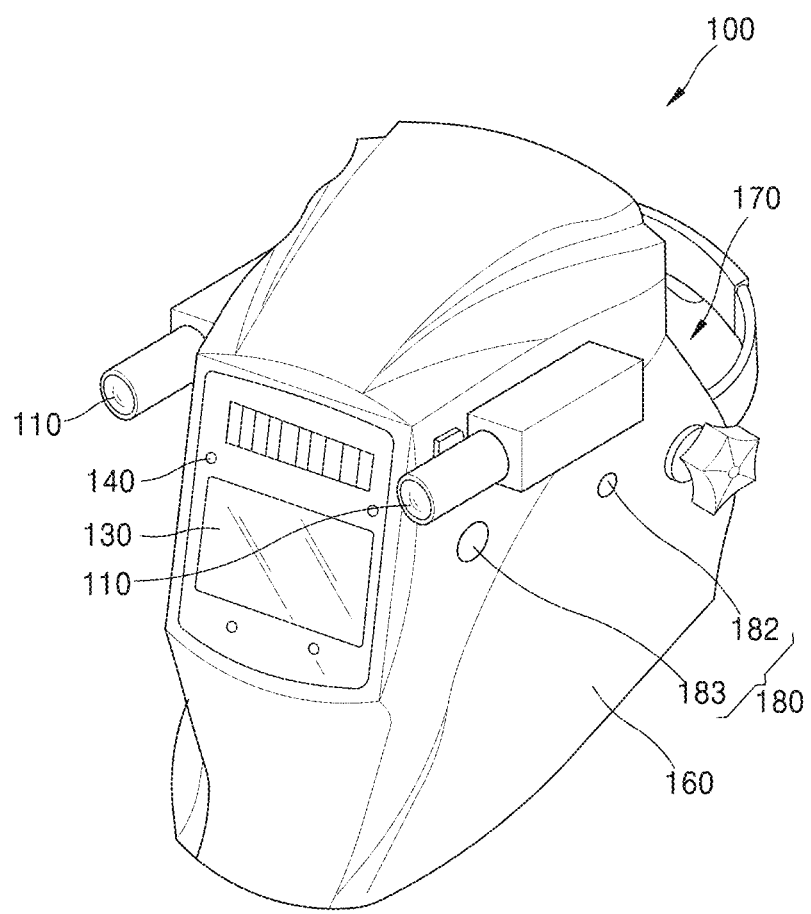
Figure 4:
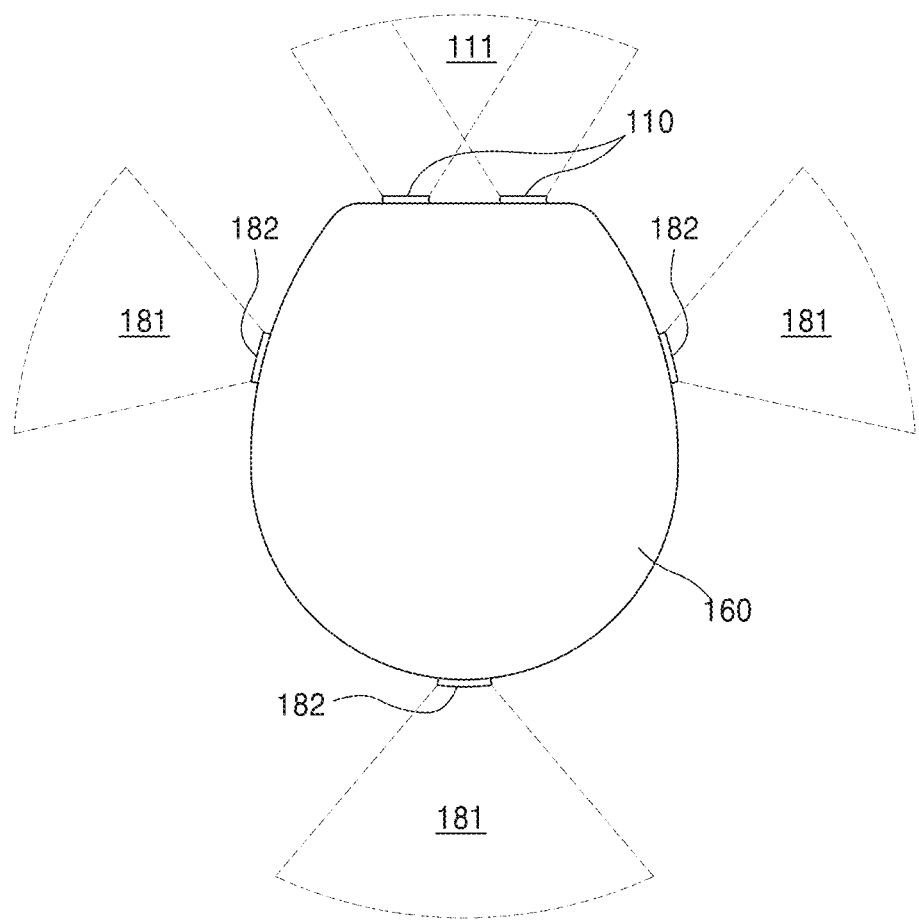
FIG. 4 is a plan view of a welding information providing apparatus according to an embodiment.

FIGS. 3A to 4 are views schematically showing the welding information providing apparatus 100 according to an embodiment. FIGS. 3A and 3B are perspective views illustrating a welding information providing apparatus equipped with a plurality of camera units according to different embodiments.

Referring to FIG. 3A, the welding information providing apparatus 100 according to an embodiment may include a main body 160, the display unit 130 installed on the main body 160, at least one camera unit 110 mounted in one area of a front portion of the main body 160, the environmental management unit 180 mounted toward the outside of the main body 160, at least one sensor unit 140, and a fixing unit 170 arranged on a rear surface of the main body 160 and fixing the welding information providing apparatus 100 to the worker's head.

According to an embodiment, the camera unit 110 may be implemented in plural. For example, when there are two camera units 110, they may be symmetrically mounted on one area of the front portion of the display unit 130. At this time, the front portion of the display unit 130 may be an external area corresponding to a direction in which welding is performed (the area shown in FIG. 3A). Conversely, the rear portion of the display unit 130 may be an internal area corresponding to a face direction of a worker.

FIG. 3A shows that at least one sensor unit 140 (or first sensor) is mounted on one area of the front portion of the display unit 130, but according to an embodiment, the sensor 140 may be mounted on the main body 160. At this time, the sensor unit 140 may be mounted in a front direction of the main body 160 to detect a welding situation.

The body 160 that protects the worker's face may include a material having a certain strength, for example, reinforced plastic, but the disclosure is not limited thereto, and various materials may be used as long as they are resistant to elements such as sparks that may occur during welding.

The fixing unit 170 is a configuration that directly contacts the worker's head, and at least a portion of one side of the fixing unit 170, that is, an inner surface directly contacting the worker's head may include a soft material such as a fiber material or a cushion material.

The environmental management unit 180 may include an environmental sensing module 182 mounted outside the main body 160 and a switching unit 183 located outside the main body 160. Referring to FIG. 3B, the main body 160 protecting the worker's face of the disclosure may include the display unit 130 and the sensor unit 140 installed in front of the main body 160. Also, at least one camera unit 110 may be symmetrically mounted on both sides of the main body 160. In addition, the welding information providing apparatus 100 may include the fixing unit 170 arranged on a rear surface of the main body 160 to fix the welding information providing apparatus 100 to the worker's head.

In particular, the camera unit 110 is implemented with two cameras, and the cameras may be mounted on both sides of the main body 160 in directions corresponding to working directions of the worker, respectively. Although not shown in the drawing, when the camera 110 is odd, the cameras may be mounted at the center top of the main body 160. The rear portion of the display unit 130 in this example may display a synthesized welding image to the worker in a direction of the worker's face. In addition, the rear portion of the display unit 130 may display a UI for a current state, such as a battery state of the welding information providing apparatus 100 when a preset event occurs.

FIG. 3B shows that at least one sensor unit 140 (or first sensor) is mounted on one area of the front portion of the display unit 130, but according to an embodiment, the sensor 140 may be mounted on the main body 160. According to another embodiment, the sensor unit 140 may be mounted as being included in at least a portion of the at least one camera unit 110.

Also in the embodiment shown in FIG. 3B, the environmental management unit 180 may include the environmental sensing module 182 mounted outside the main body 160 and the switching unit 183 located outside the main body 160.

In the embodiments illustrated in FIGS. 3A and 3B, the environmental sensing module 182 may be mounted in plural along the outside of the main body 160. According to an embodiment, the environmental sensing module 182 may be located on both sides and/or a back side of the main body 160.

The environmental sensing module 182 may include a camera module with an image sensor. Accordingly, the first processor 150 may obtain environment image information.

Optionally, the environmental sensing module 182 may include a proximity sensor. Accordingly, the first processor 150 may obtain object information changed by surroundings.

The switching unit 183 may be selectively located outside the main body 160 at a location easily controlled by a worker. According to an embodiment, the switching unit 183 may be located adjacent to the display unit 130 at a location of the worker's hand that does not adjust a welding torch. The switching unit 183 is electrically connected to the above-described first processor 150, and according to the operation of the switching unit 183, the first processor 150 may end the operation of the environmental sensing module 182.

FIG. 4 is a plan view of the welding information providing apparatus 100 according to an embodiment.

Referring to FIG. 4, the environmental sensing module 182 of the environmental management unit 180 may be located on both sides and a rear surface of the main body 160, that is, at different locations from that of the camera unit 110.

In this case, a welding imaging area 111 for a welding area is formed toward the front of a worker by the camera unit 110, and an environmental sensing area 181 is formed by environmental sensing modules 182. The welding imaging area 111 may be a forward direction of a welder, and the environmental sensing area 181 may be both sides and rear area of the welder. The environment sensing area 181 may be an area that the welding imaging area 111 does not reach, and accordingly, the welder may obtain information about a surrounding area in addition to an area where welding is performed. According to an embodiment, the environment sensing area 181 may not overlap the welding imaging area 111.

In the embodiment illustrated in FIG. 4, the environment sensing areas 181 do not overlap each other, but the disclosure is not limited thereto. The environment sensing areas 181 may overlap each other. For example, when a wide viewing angle camera module such as a fisheye camera module is used as the environmental sensing module 182, the environment sensing areas 181 may partially overlap each other. In this case, a portion of the environment sensing area 181 may overlap an edge of the welding imaging area 111.

Figure 5:
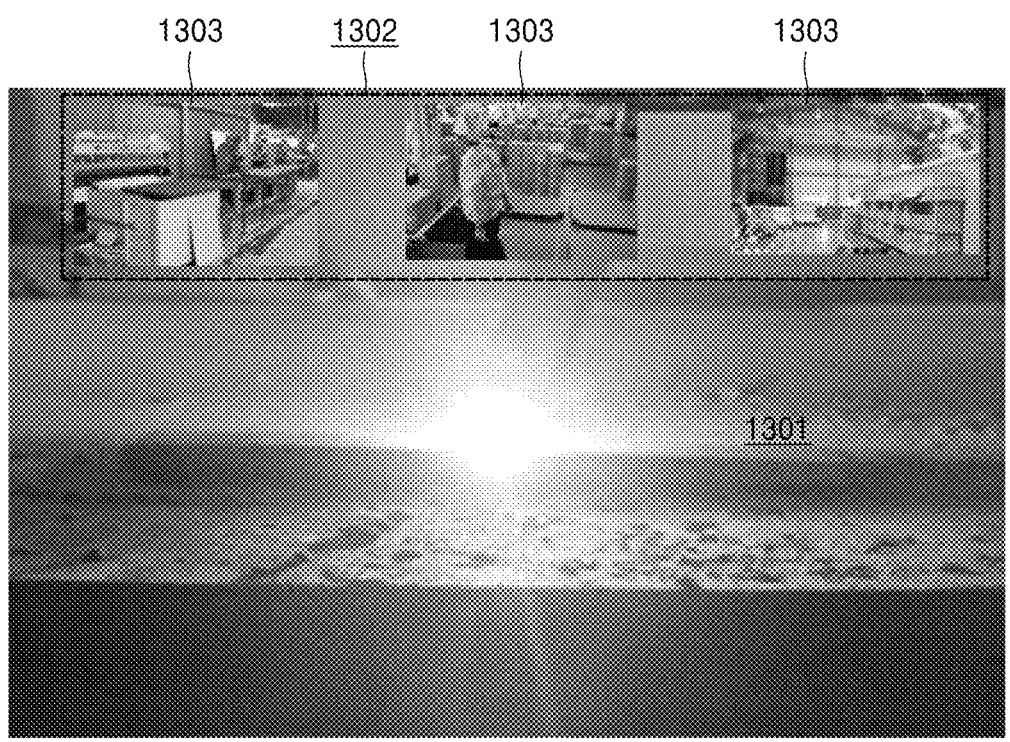
FIG. 5 is a view of image information provided to a worker by a display unit according to an embodiment.

FIG. 5 is a view of image information provided to a worker by the display unit 130 according to an embodiment. The embodiment illustrated in FIG. 5 shows a case in which the environmental sensing modules 182 are camera modules.

The display unit 130 provides a main screen 1301 to a worker, wherein the main screen 1301 may be an image captured with respect to the welding imaging area 111 described above. Therefore, the worker may be provided with information about a situation in which welding is being performed on the main screen 1301.

An environment display area 1302 may be located in one area of the main screen 1301. According to the embodiment illustrated in FIG. 5, the environment display area 1302 may be located above the main screen 1301, but the disclosure is not limited thereto. The environment display area 1302 may be located on at least one side of the main screen 1301 under conditions that do not interfere with the welding.

Environment images 1303 photographed by the camera modules, which are the environmental sensing modules 182, may be displayed on the environment display area 1302. An environment image 1303 photographed by a left camera module may be arranged on the left side of the environment display area 1302, an environment image 1303 photographed by a right camera module may be arranged on the right side of the environment display area 1302, and an environment image 1303 photographed by a rear camera module may be arranged at the center of the environment display area 1302.

By obtaining information about the left, right, and rear environment images 1303 from the environment display area 1302 as described above, the worker may check what is happening in the surroundings even during the welding operation. Accordingly, the worker may smoothly communicate with colleagues around him or her or may protect himself or herself from dangers from the surroundings.

Figure 6:
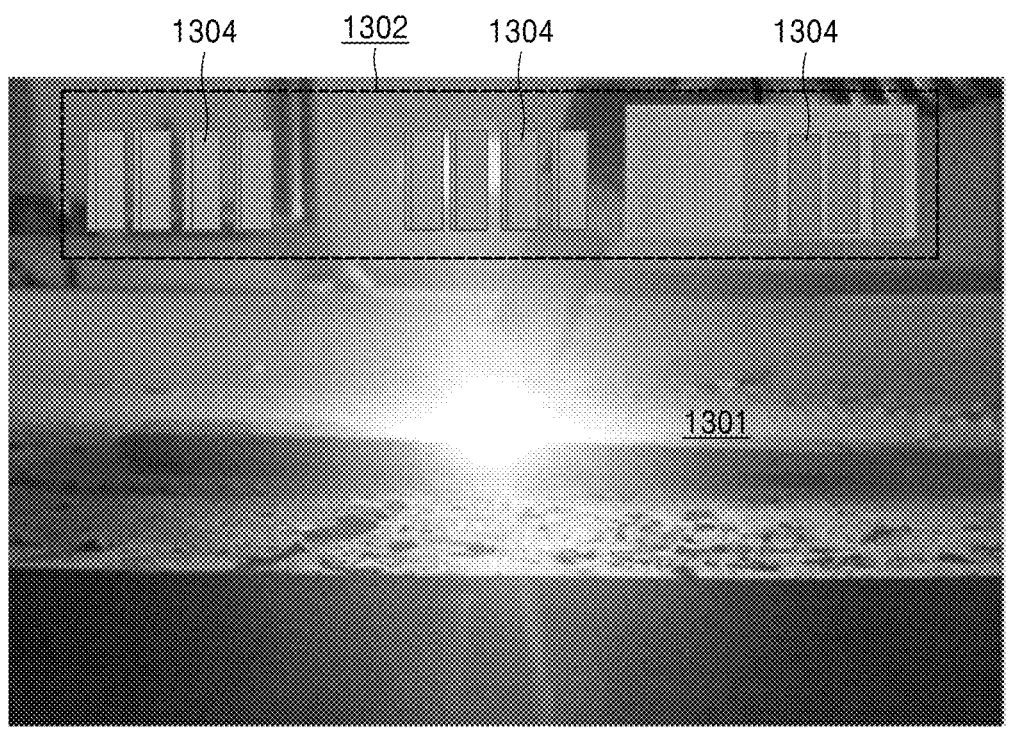
FIG. 6 is a view of image information provided to a worker by a display unit according to another embodiment.

FIG. 6 is a view of image information provided to a worker by the display unit 130 according to another embodiment. The embodiment illustrated in FIG. 6 shows a case in which the environmental sensing modules 182 are proximity sensors.

The display unit 130 may provide the main screen 1301 and the environment display area 1302 to a worker, as in the above-described embodiment.

The environment display area 1302 may display recognition information 1304 of changes in a surrounding object detected by a proximity sensor that is the environmental sensing module 182. That is, the recognition information 1304 detected by a left proximity sensor may be arranged on the left side of the environment display area 1302. The recognition information 1304 detected by a right proximity sensor may be arranged on the right side of the environment display area 1302. The recognition information 1304 detected by a rear proximity sensor may be arranged at the center of the environment display area 1302.

As described above, the recognition information 1304 may be displayed in a plurality of bar shapes. By changing the bar display, it is possible for a worker to recognize the degree to which an object (including a person) is approaching the worker. For example, when there is no object in an adjacent area or the object is far away, the bar may not be displayed, and as the object approaches the worker, a large number of bars may be displayed.

By obtaining the left, right, and rear recognition information 1304 from the environment display area 1302 as described above, the worker may check what is happening in the surroundings even during the welding operation. Accordingly, the worker may smoothly communicate with colleagues around him or her or may protect himself or herself from dangers from the surroundings.

The recognition information as described above may be separately or selectively transmitted to the worker as sound information by a buzzer and/or vibration information. Even at this time, it is possible to allow the worker to sense the direction.

Meanwhile, the above-described switching unit 183 may simultaneously switch all the environmental sensing modules 182 shown in FIG. 4, that is, all the environmental sensing modules 182 may be switched in one operation.

However, the disclosure is not limited thereto, and according to another embodiment, the switching unit 183 may sequentially switch operations of the plurality of environmental sensing modules 182. For example, an operation algorithm in which when the switching unit 183 is pressed once, a left environmental sensing module 182 operates, when the switching unit 183 is pressed twice, a right environmental sensing module 182 operates, and when the switching unit 183 is pressed three times, a rear environmental sensing module 183 operates may be taken. The method of operating the plurality of environmental sensing modules 182 by using one switching unit 183 may be of various combinations.

In addition, the first processor 150 may control the display on the environment display area 1302 according to the operations of the switching unit 183.

Figure 7:
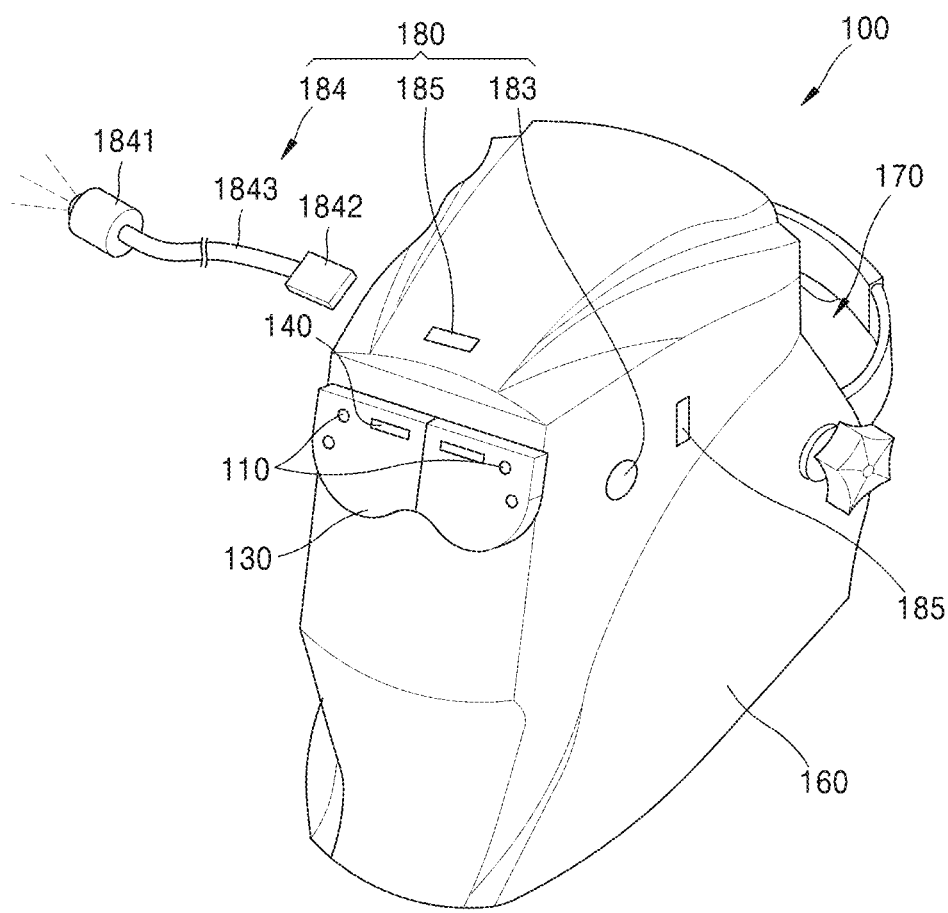
FIG. 7 is a view of a welding information providing apparatus according to another embodiment.

FIG. 7 is a view of the welding information providing apparatus 100 according to another embodiment.

Referring to FIG. 7, the welding information providing apparatus 100 may include the environmental management unit 180 according to another embodiment, and the environmental management unit 180 may include an environment imaging module 184.

The environment imaging module 184 may include a camera module 1841 and a location conversion module 1843. The camera module 1841 may include at least one camera that captures an image and a light adjacent to the camera. The location conversion module 1843 may be connected to the camera module 1841 to change an imaging direction captured by the camera module 1841 as the location of the camera module 1841 is changed. The camera module 1841 may be electrically connected to the above-described first processor 150 through the location conversion module 1843. Accordingly, the camera module 1841 may transmit the captured image data to the first processor 150. When it is necessary to perform welding on an area that is not easily visible to a worker by the environment imaging module 184, by providing image information about this area to the worker, it is possible for the worker to easily perform welding even in an environment where welding is difficult.

Optionally, the environmental imaging module 184 may be detachably provided on the main body 160. To this end, first connectors 185 may be located at a plurality of locations in the main body 160, and a second connector 1842 may also be installed in the location conversion module 1843 of the environmental imaging module 184. The second connector 1842 may be electrically connected to each other by being coupled to one of the first connectors 185. The first connectors 185 may be electrically connected to the first processor 150 to transmit image data received through the second connector 1842 to the first processor 150. In this way, because the environment imaging module 184 is detachably provided on the main body 160, the worker does not use the environment imaging module 184 in normal work, but only when necessary, so that the worker in the normal work may be prevented from being disturbed by the environment imaging module 184.

Optionally, the environmental management unit 180 may further include the above-described environment imaging module 184 and the switching unit 183 electrically connected to the first processor 150.

The switching unit 183 may be selectively located outside the main body 160 at a location easily controlled by the worker. According to an embodiment, the switching unit 183 may be located adjacent to the display unit 130 at a location of the worker's hand that does not adjust the welding torch. The switching unit 183 is electrically connected to the above-described first processor 150, and according to the operation of the switching unit 183, the first processor 150 may end the operation of the environmental imaging module 184.

Also, according to the operation of the switching unit 183, the first controller 150 may selectively switch a screen displayed on the display unit 130. That is, according to the operation of the switching unit 183, the first controller 150 may or may not display image information obtained from the environment imaging module 184 on the screen displayed on the display unit 130. The image information obtained from the environment imaging module 184 may be displayed on a main screen of the display unit 130. Depending on the operation of the switching unit 183, an image of the main screen may be an image obtained from the environment imaging module 184 or an image obtained from the camera unit 110. Optionally, the image information obtained from the environment imaging module 184 may be displayed as an auxiliary screen located in a portion of the main screen of the display unit 130. Depending on the operation of the switching unit 183, the auxiliary screen on which the image obtained from the environment imaging module 184 is displayed may be turned on or off. Therefore, the worker may perform welding more conveniently by receiving the image information obtained from the camera unit 110 and the image information obtained from the environment imaging module 184 in various forms. Meanwhile, the display unit 130 of the welding information providing apparatus 100 according to an embodiment may be implemented as a structure capable of arbitrarily opening a portion corresponding to at least one eye or both eyes.

According to another embodiment, the display unit 130 may be equipped with the camera unit 110 and the sensor unit 140. The camera unit 110 and the sensor unit 140 may be mounted in one area of the front portion of the display unit 130. At this time, the front portion of the display unit 130 may mean an area corresponding to a direction in which welding is performed, and the rear portion of the display unit 130 may mean an area corresponding to the direction of the workers face and corresponding to a direction in which a welding image is displayed.

The display unit 130 according to an embodiment may include four camera units 110 and two sensor units 140. According to an example, some of the four camera units 110 may be thermal imaging cameras. The four camera units 110 may be mounted on one area of the front portion of the display unit 130 by two to correspond to each eye. In this case, it is possible to obtain a multi-angle image, thereby providing a stereoscopic high-definition image to a worker.

According to an embodiment, the first processor 150 may be mounted adjacent to the display unit 130. The display unit 130 may synthesize images obtained by using the camera unit 110 and the sensor unit 140 in the first processor 150 and display the images to a user. The display unit 130 may be used in a form detachable from the main body 160.

According to an embodiment, the at least one sensor unit 140 may be mounted on one area of the front portion of the display unit 130 to correspond to each eye. As another example, the sensor unit 140 may be mounted in a front direction of the main body 160 to detect a welding situation.

Figure 8:
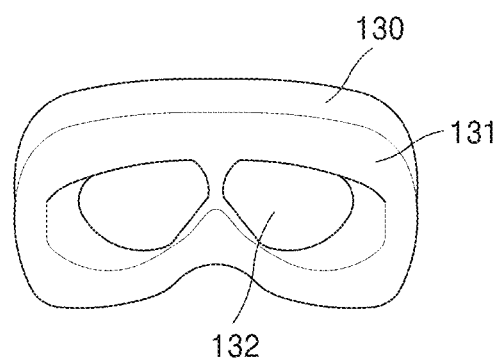
FIG. 8 is a view of a portion of a welding information providing apparatus according to another embodiment.

FIG. 8 illustrates the inside of the welding information providing apparatus 100 according to an embodiment.

FIG. 8 is a view showing a rear portion of the display unit 130 according to an embodiment. Referring to FIG. 8, the display unit 130 may be separated from the welding information providing apparatus 100 and implemented in a separate configuration. The rear portion of the display unit 130 may include an eyepiece part 131 and an eyepiece display 132. The eyepiece part 131 may be fixed in close contact with the workers face. The worker may watch a high-definition synthesized image displayed on the eyepiece display 132 by bringing binocular parts in close contact with the eyepiece part 131. In another embodiment, the eyepiece parts 131 may each include a lens unit, and the lens unit may enlarge the high-definition synthesized image to easily form an image on the user's eye.

Meanwhile, according to an embodiment, the display unit 130 may display an image synthesized based on an image obtained by the camera unit 110 corresponding to each eye on the eyepiece display 132 corresponding to each eye.

For example, when a first camera mounted in an area corresponding to the left eye obtains an image under a first imaging condition, and the display unit 130 may display a first synthesized image synthesized based on the first imaging condition on the first eyepiece display 132 included in an area corresponding to the left eye in the rear portion. Similarly, when a second camera mounted in an area corresponding to the right eye obtains an image under a second imaging condition, and the display unit 130 may display a second synthesized image generated as a result of synthesis based on the second imaging condition, on the second eyepiece display 132 included in the area corresponding to the right eye in the rear portion.

According to the above, it is possible to provide a stereoscopic and fluid synthesized image compared to displaying the same synthesized image in both eyes. However, this is only an example, and it is needless to say that each eyepiece display 132 may display the same synthesized image even if the camera unit 110 corresponding to each eyepiece display 132 is photographed under different conditions.

In the case of the above-described embodiments, the main body 160 is a structure surrounding the user's head to a certain extent, but the disclosure is not necessarily limited thereto. The body may be provided to cover only the user's face, or may include various structures that may be worn by a user in the form of goggles or glasses.

In addition, in the above-described embodiment, the camera unit is shown to be synthesized of two cameras, but the disclosure is not necessarily limited thereto, and the same can be applied to a camera unit synthesized of one camera.

Figure 9:
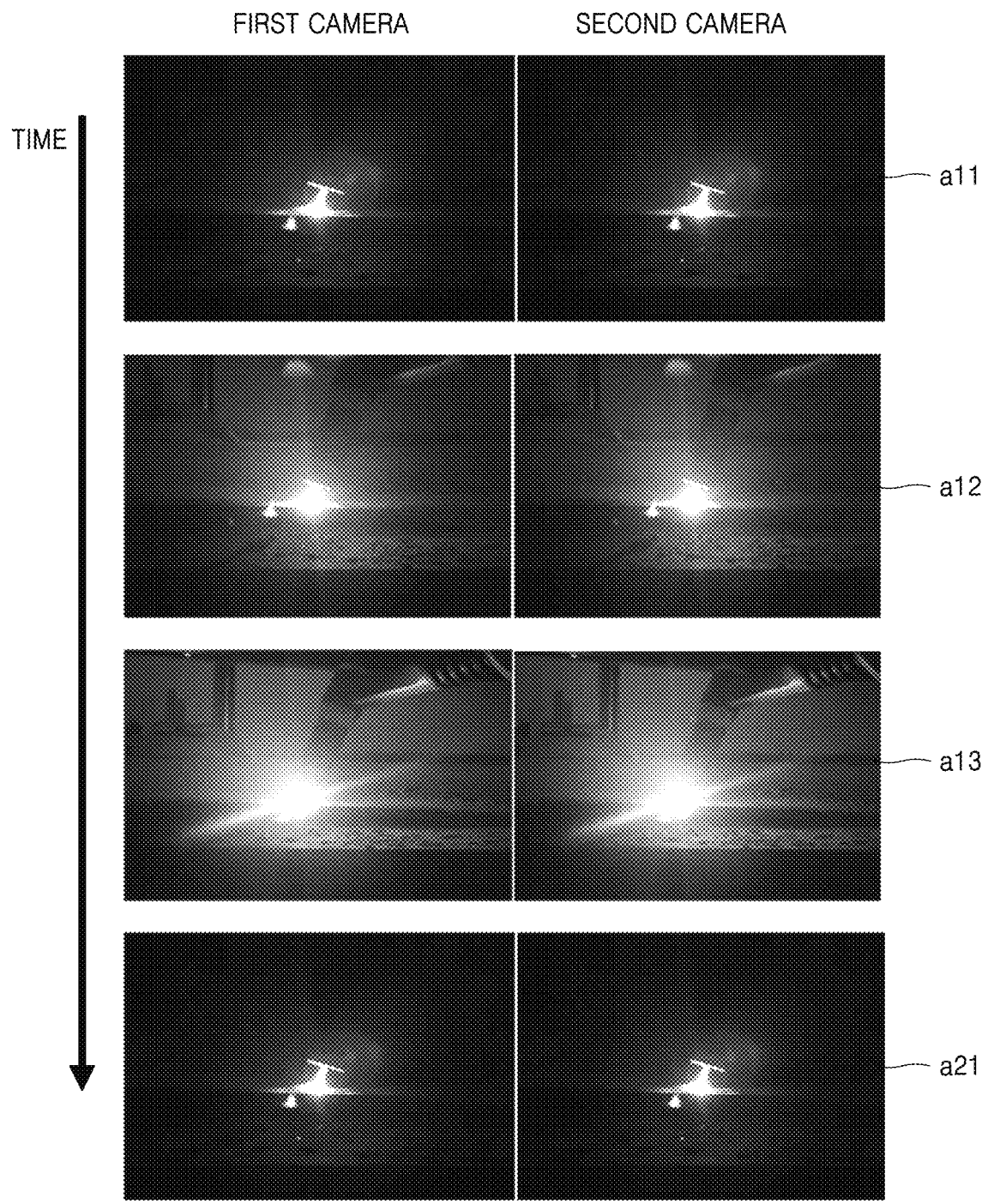
FIG. 9 is a view for explaining a camera obtaining an image according to an embodiment.

FIG. 9 is a view for explaining that the camera unit 110 obtains an image according to an embodiment.

FIG. 9 shows an example in which the camera unit 110 of the disclosure includes two cameras. Referring to FIG. 9, a first camera and a second camera of the camera unit 110 may change imaging conditions in chronological order and photograph a welding site. At this time, the imaging conditions may include ISO sensitivity, GAIN, shutter speed, and the like.

A first frame a11 and a fifth frame a21 are taken under a first imaging condition, a second frame a12 is taken under a second imaging condition, and a third frame a13 is taken under a third imaging condition. This example shows that the first camera and the second camera are shot in the same frame under the same imaging condition.

For example, the first imaging condition may be that the shutter speed is faster than that of the second imaging condition and may be set with high sensitivity and high gain, and the third imaging condition may be low-sensitivity setting having the slowest shutter speed. However, the above-described example is only an example, and the camera unit 110 may obtain images under various imaging conditions.

Figure 10A:
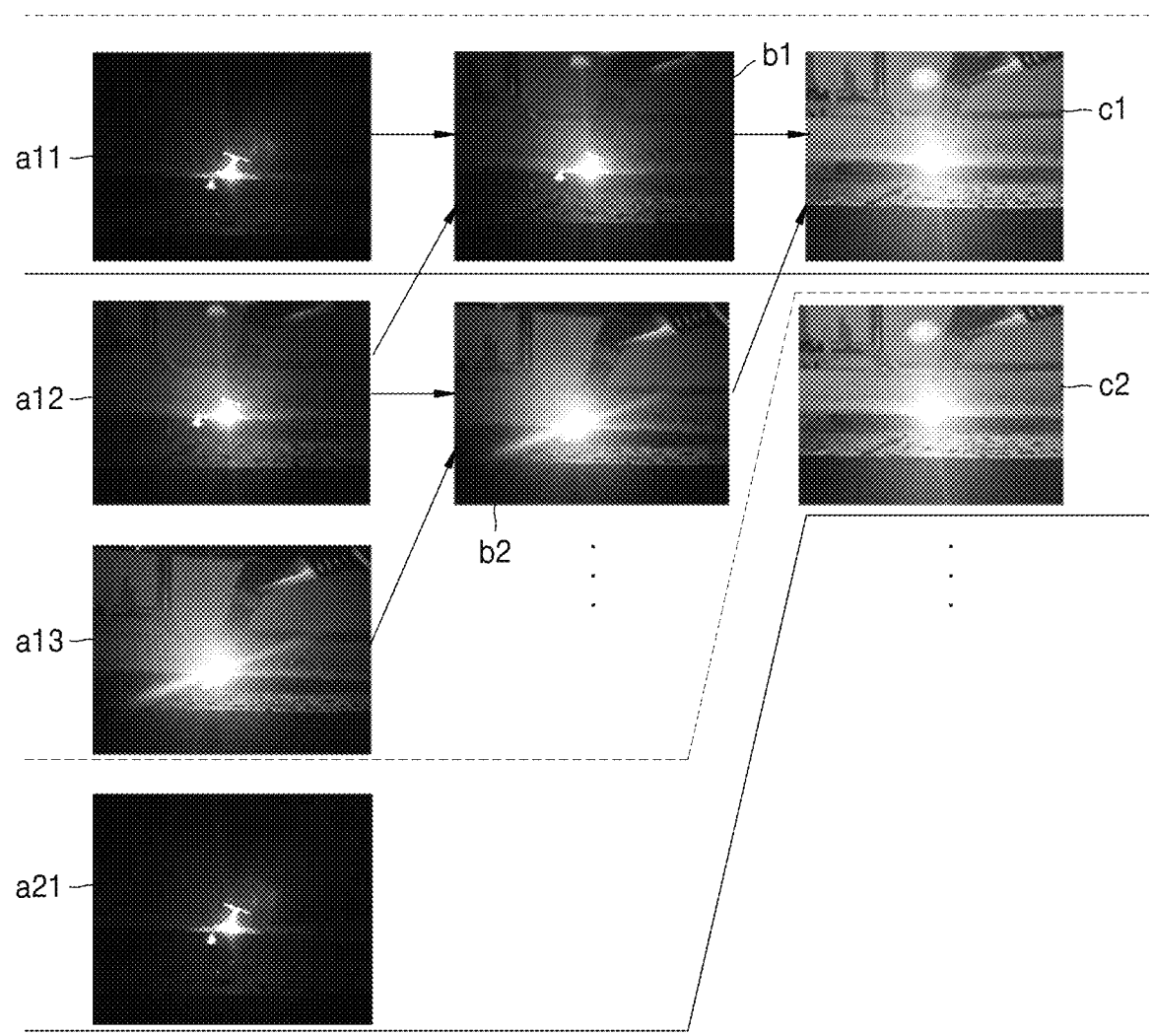
FIGS. 10A and 10B are views for explaining that a processor according to an embodiment synthesizes an image obtained as in FIG. 9 and improves the quality of the composite image.
Figure 10B:
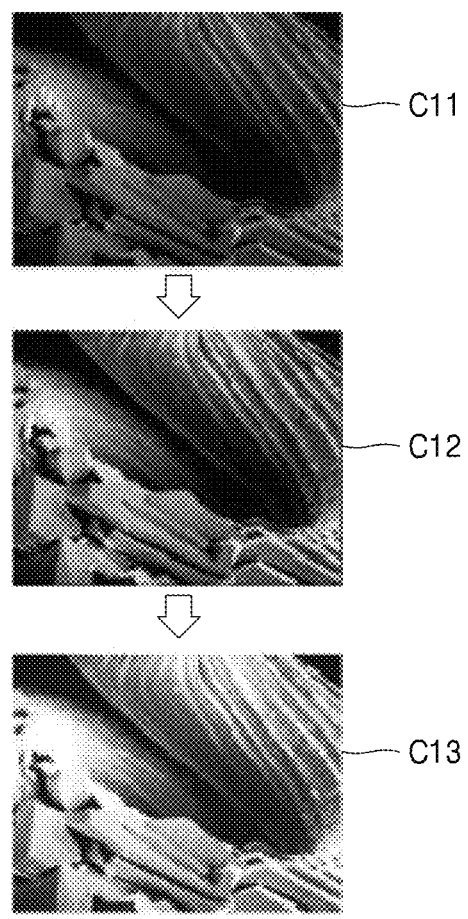

FIGS. 10A and 10B are views for explaining that the first processor 150 according to an embodiment synthesizes an image obtained as in FIG. 9 and improves the quality of the synthesized image.

The first processor 150 according to an embodiment may synthesize an image based on a preset number of frames. At this time, the number of frames for one synthesized image may be set by a worker or may be set at the time of shipment.

The first processor 150 of FIG. 10A may generate a synthesized image based on three frames. In more detail, the first processor 150 may obtain a first intermediate synthesized image b1 by synthesizing the first frame a11 and the second frame a12. Also, the first processor 150 may obtain a second intermediate synthesized image b2 by synthesizing the second frame a12 and the third frame a13.

The first processor 150 may obtain a first synthesized image c1 by synthesizing the first intermediate synthesized image b1 and the second intermediate synthesized image b2.

Similarly, the first processor 150 may synthesize a third intermediate synthesized image (not shown) by synthesizing the third frame a13 and a fourth frame (not shown), and may obtain a second synthesized image c2 by synthesizing the second intermediate synthesized image b2 and a third intermediate synthesized image (not shown).

As described above, according to an embodiment, a high-definition synthesized image may be obtained by synthesizing photographs taken through various imaging conditions in an HDR method. Through the high-definition synthesized image described above, the worker may easily identify peripheral portions other than a portion adjacent to a welding light spot. That is, in the related art, the brightness of welding light is overwhelmingly brighter than that of the peripheral portions, and thus, there is a problem where the worker cannot easily identify the shape of a welded welding bead and the surroundings of the welding. However, according to the welding system 10 of the disclosure, even a beginner worker may easily identify the peripheral portions through a high-definition image.

Meanwhile, the first processor 150 may synthesize the first synthesized image c1 and the second synthesized image c2 in parallel. According to an embodiment, the first processor 150 may obtain a plurality of synthesized images at the same speed as the speed at which the frames are captured through the camera unit 110 by performing parallel image synthesis at intervals of one frame.

FIG. 10B is a view illustrating that the first processor 150 performs contrast ratio processing on a synthesized image according to an embodiment.

Referring to FIG. 10B, the first processor 150 may perform contrast ratio processing on the obtained synthesized image. For example, the first processor 150 may obtain a second synthesized image c12 and a third synthesized image c13 by performing additional contrast ratio processing on an obtained first synthesized image c11.

As described above, a contrast ratio may be increased through the additional contrast ratio processing on a synthesized image, and a light state of a welding surface may be clearly identified.

Figure 11:
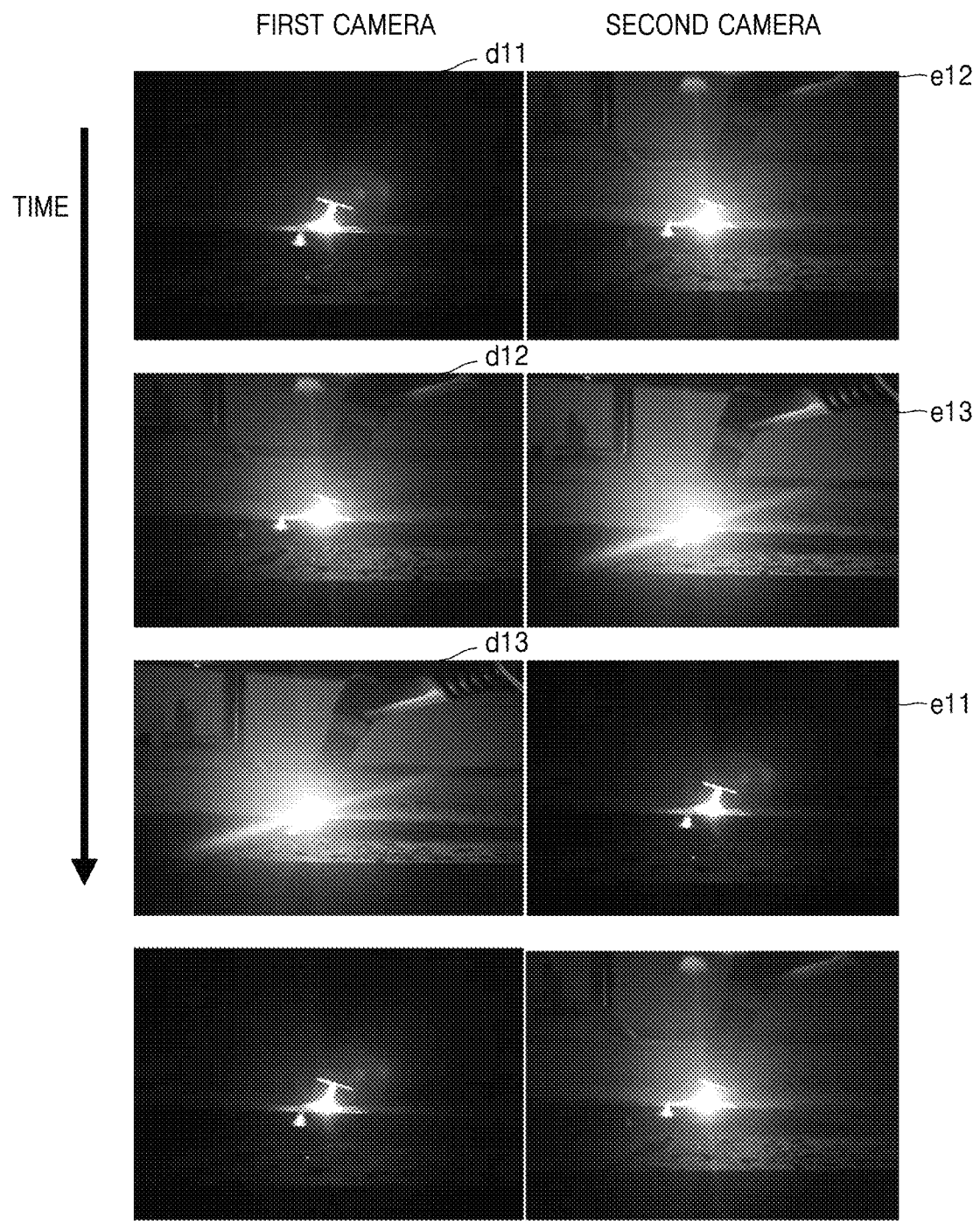
FIG. 11 is a view for explaining a plurality of cameras according to another embodiment obtaining images.

FIG. 11 is a view for explaining that a plurality of cameras according to an embodiment obtain images.

Referring to FIG. 11, a first camera and a second camera may photograph a welding situation under different imaging conditions in the same time frame.

For example, a first frame d11 of the first camera and a third frame e11 of the second camera may be taken under a first imaging condition. A second frame d12 of the first camera and a first frame e12 of the second camera are taken under a second imaging condition, and a third frame d13 of the first camera and a second frame e13 of the second camera are taken under a third imaging condition. That is, this example shows that the first camera and the second camera are photographed in different imaging conditions in the same frame.

For example, the first imaging condition may be that the shutter speed is faster than that of the second imaging condition and may be set with high sensitivity and high gain, and the third imaging condition may be low-sensitivity setting having the slowest shutter speed. However, the above-described example is only an example, and the camera unit 110 may obtain images under various imaging conditions.

Figure 12:
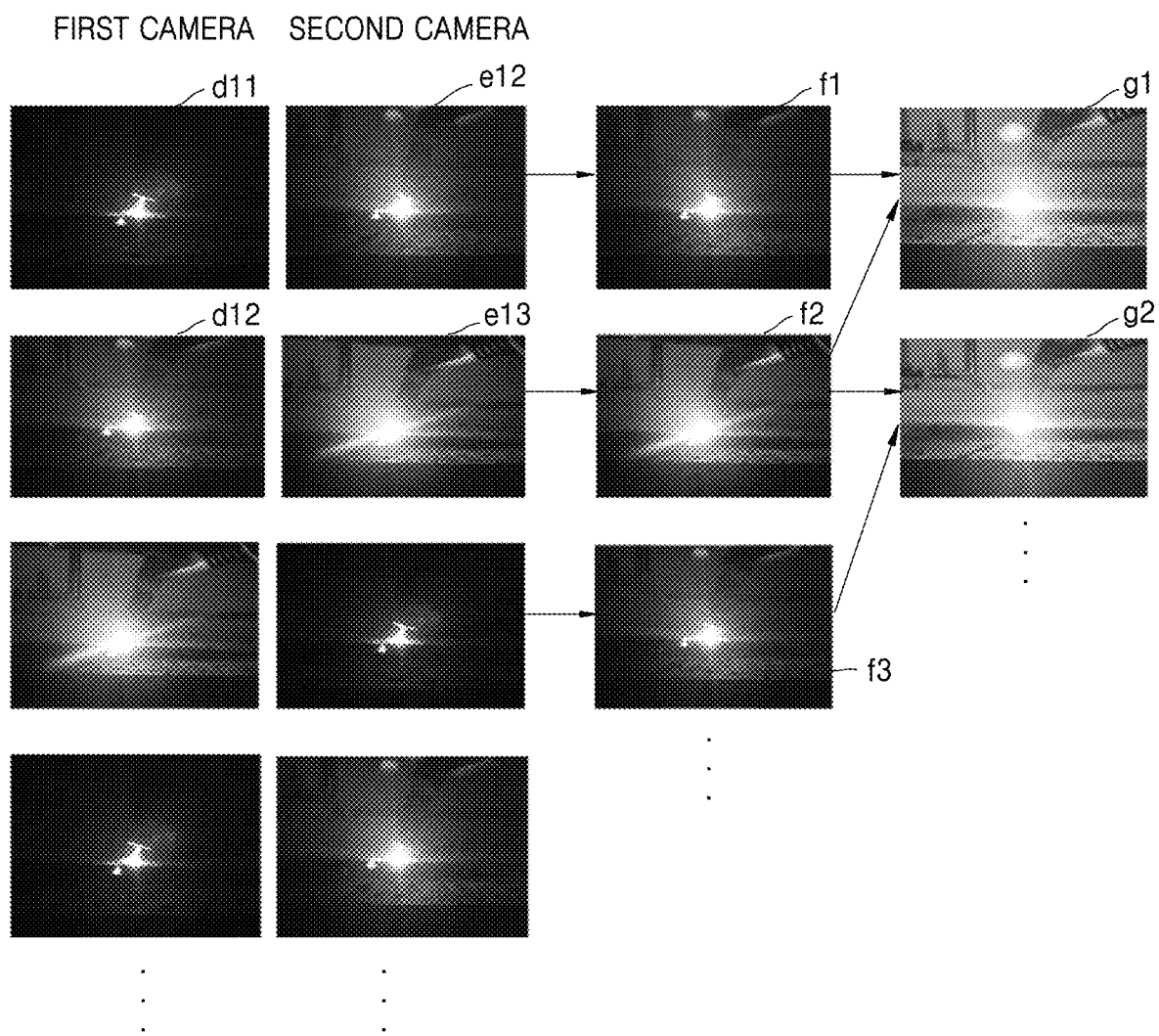
FIG. 12 is a view for explaining a method of synthesizing the images obtained in FIG. 11.

FIG. 12 is a view for explaining a method of synthesizing images captured in FIGS. 10A and 10B.

Referring to FIG. 12, the first processor 150 may obtain a first intermediate synthesized image f1 by synthesizing the first frame d11 of the first camera and the first frame e12 of the second camera. In addition, the first processor 150 may obtain a second intermediate synthesized image f2 by synthesizing the second frame d12 of the first camera and the second frame e13 of the second camera.

The first processor 150 may generate a first synthesized image g1 by synthesizing the first intermediate synthesized image f1 and the second intermediate synthesized image f2. Similarly, the first processor 150 may obtain a second synthesized image g2 by synthesizing the second intermediate synthesized image f2 and a third intermediate synthesized image f3. In the same way, the first processor 150 may obtain a third synthesized image (not shown).

As described above, according to the disclosure, by synthesizing photos taken through various imaging conditions in an HDR method, welding light of an image may be easily identified.

Meanwhile, the first processor 150 may synthesize the first synthesized image g1 and the second synthesized image g2 in parallel. According to the disclosure, the first processor 150 may obtain a plurality of synthesized images at the same speed as the speed at which frames are captured through the camera unit 110 by synthesizing images in parallel with the first camera and the second camera taking the frames.

According to an embodiment, the first processor 150 may display the synthesized image only on one side of the display unit 130 including a binocular display. For example, a synthesized image obtained by synthesizing the image obtained through the first camera by the method of FIG. 10A may be displayed on a display of the eyepiece display 132 corresponding to the first camera. On the other hand, a synthesized image obtained by the method of FIG. 12 may be displayed on a display of the eyepiece display 132 corresponding to the second camera. Through this, by providing an image in which welding light of a welding surface is corrected by an HDR method on only one of eyepiece displays 132, a three-dimensional effect may be provided.

FIGS. 9 to 12 describe that a imaging condition of the camera unit 110 is changed for each frame and a welding site image or a welding image frame is obtained. However, according to another embodiment, the first processor 150 of the disclosure may change a light-shielding degree of an automatic light-shielding cartridge based on sensing information about the intensity of welding light obtained through the sensor unit 140. Here, when the camera unit 110 is located inside the automatic light-shielding cartridge, a welding image frame may be obtained by changing the light-shielding degree of the automatic light-shielding cartridge installed in a front portion of the camera unit 110.

In this case, the first processor 150 may obtain frames (a11 to a13, a21, d11 to d13, e11 to e13, etc.) having a difference in contrast ratio as shown in FIGS. 9 to 12 by changing the light-shielding degree while maintaining the same imaging condition of the camera 110.

Figure 13:
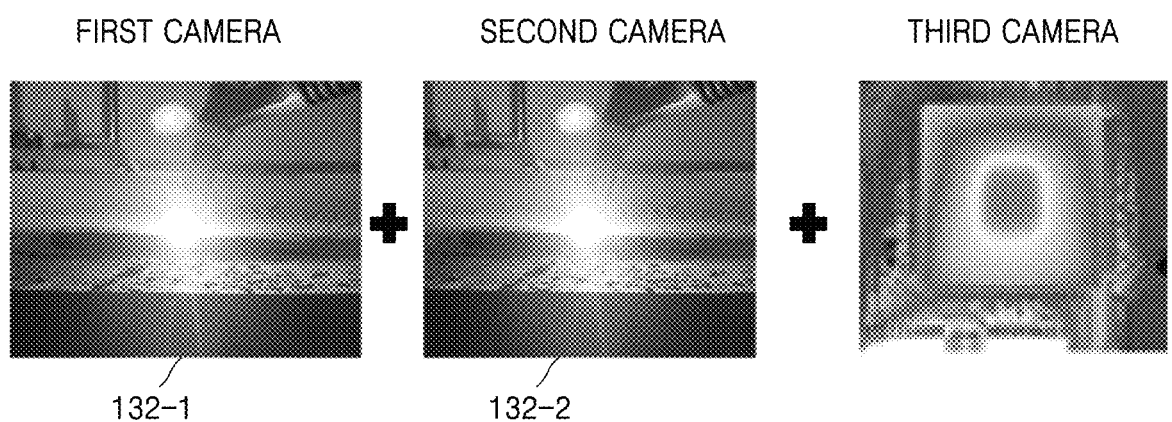
FIG. 13 is a view for explaining a method of providing an image to a display unit according to another embodiment.

FIG. 13 is a view for explaining a method of providing an image to the display unit 130 according to another embodiment.

Referring to FIG. 13, the camera unit 110 according to an embodiment may include a first camera, a second camera, and a third camera. The display unit 130 may include a first eyepiece display 132-1 and a second eyepiece display 132-2. In this case, the first camera may be a camera corresponding to the first eyepiece display 132-1, the second camera may be a camera corresponding to the second eyepiece display 132-2, and the third camera may be a thermal imaging camera.

The first eyepiece display 132-1 and the second eyepiece display 132-2 of the embodiment may display a high-definition synthesized image to which an HDR method is applied based on images obtained by the first camera and the second camera.

According to an embodiment, the processor 150 may obtain a thermal image synthesized image obtained by further synthesizing a thermal image obtained by the third camera in addition to the high-definition synthesized image. The first eyepiece display 132-1 and the second eyepiece display 132-2 may respectively display a thermal image synthesized image. In this case, the first eyepiece display 132-1 and the second eyepiece display 132-2 may use color to provide visual information about welding temperature.

According to an embodiment, different images may be displayed on the first eyepiece display 132-1. For example, an image to which the HDR technique is not applied may be displayed on the first eyepiece display 132-1, and a synthesized image to which the HDR technique is applied may be displayed on the second eyepiece display 132-2. Even in this case, the first processor 150 may synthesize a thermal image to each of the image to which the HDR technique is not applied and the synthesized image to which the HDR technique is applied, and may control the display unit 130 to display the synthesized thermal image on each of the first eyepiece display 132-1 and the second eyepiece display 132-2.

Figure 14:
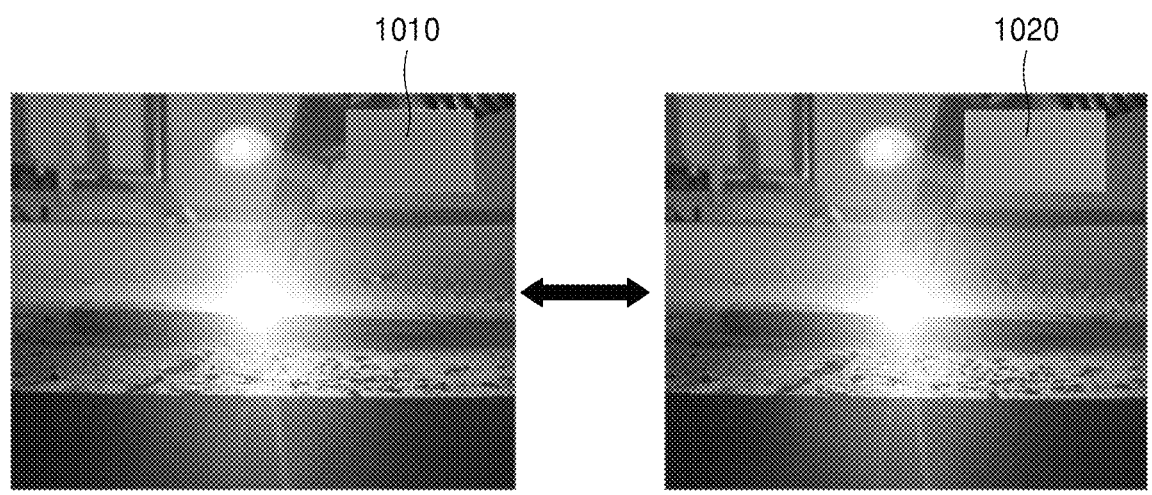
FIG. 14 is a view for explaining an embodiment of displaying welding information according to another embodiment.

FIG. 14 is a view for explaining an embodiment for displaying welding information according to another embodiment.

The first processor 150 according to an embodiment may provide feedback on a state of a welding current and/or a voltage in a welding power cable based on the welding information sensed from the welding torch 200. In more detail, referring to FIG. 14, the first processor 150 may provide a UI for a current state to a portion of an image screen displayed by the display unit 130. At this time, the UI may display information in a preset color using RGB.

For example, when a state of a current and/or a voltage of the welding torch 200 is detected as abnormal, the welding information providing apparatus 100 according to an embodiment may display a red UI 1010 as visual feedback for warning, and in other cases, a green UI 1020.

In addition to a current state, the first processor 150 may provide feedback for a variety of welding information. For example, as illustrated in FIGS. 15A and 15B, the welding information providing apparatus 100 may guide a UI for a welding direction of a torch through visual feedback.

Figure 15A:
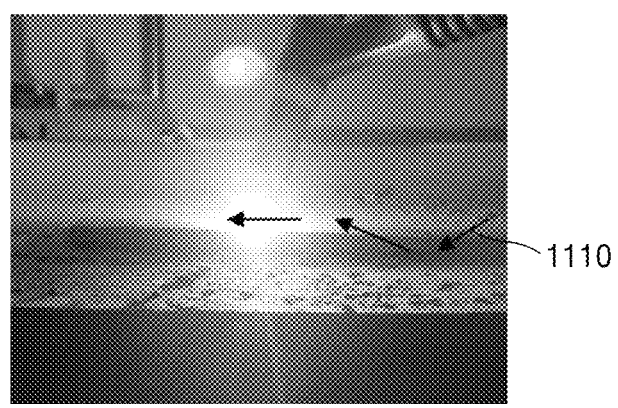
FIGS. 15A and 15B are views for explaining a welding information providing apparatus guiding a user interface (UI) in a welding direction of a torch through visual feedback.

Referring to FIG. 15A, the first processor 150 may display information about the welding direction with an arrow UI 1110. In more detail, the first processor 150 may be provided to a worker by displaying a straight line arrow for each welding direction based on information detected through an acceleration sensor included in the welding torch 200.

Figure 15B:
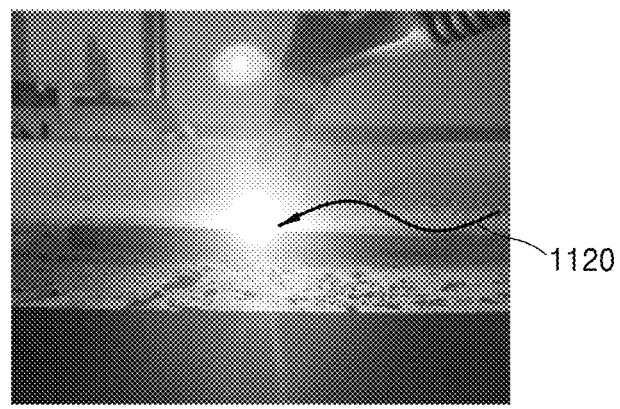

Alternatively, referring to FIG. 15B, the first processor 150 may display information about the welding direction with the curved arrow UI 1110. In more detail, based on information detected by an acceleration sensor included in the welding torch 200, the first processor 150 may form a previously-worked welding direction as a curved arrow and display the curved arrow through the display unit 130 to provide the curved arrow to the worker.

However, this is only an example, and the first processor 150, based on sensing information including welding temperature, a welding slope, and welding speed for real-time welding detected through at least one sensor 220 included in the welding torch 200 and a distance between a base material and a welding torch, may display a UI corresponding to the sensing information about a portion of the display unit 130.

For example, when receiving sensing information about a welding temperature value, the first processor 150 may display a UI corresponding to the welding temperature value in various ways such as light, vibration, and message. At this time, the UI may be visual feedback displayed on the display unit 130 or a portion of a display, or may be audible feedback through voice.

Meanwhile, the sensing information about the welding temperature value may include whether or not the temperature of a base material exceeds a preset temperature range. Further, the sensing information about the welding temperature value may include a numerical value, a grade, a level, and the like corresponding to a temperature value of a welding surface.

When the first processor 150 according to an embodiment determines that a temperature value of a welding base is outside the preset temperature range, the welding information providing apparatus 100 may guide the worker to stop the work. In the case of welding outside the preset temperature range, there is a risk of deterioration in quality, and thus, the worker may be guided to adjust the temperature value of the welding base.

As another example, when receiving sensing information about a welding speed value, the first processor 150 may display a UI corresponding to the welding speed value. At this time, the UI may be visual feedback provided to the display unit 130 or the display, or may be audible feedback through voice.

When it is determined that welding speed of the torch is outside a normal range, the first processor 150 according to another embodiment may guide the worker to stop the work through visual feedback. In this case, the visual feedback may be to provide an icon indicating a danger in a partial area of a display unit displaying a work site.

As another example, the first processor 150 may provide a UI such that a worker may easily identify a shape corresponding to a previously welded bead. In more detail, when the shape of the welding bead is detected, the first processor 150 may overlap and display a UI of the shape of the welding bead on a high-definition synthesized image.

At this time, by using a thermal imaging camera included in the welding information providing apparatus 100, it is possible to obtain the shape of the welding bead by detecting residual temperature of a base material after welding. This is only an embodiment, and the welding information providing apparatus 100 may obtain the shape of the welding bead through various methods. All of the embodiments described in this specification may be applied to each other in combination with each other.

On the other hand, the welding information providing apparatus 100 of the above-described embodiments has been exemplified for use in a welding operation, but the disclosure is not necessarily limited thereto. That is, the welding information providing apparatus 100 of the above-described embodiments may be implemented as an information providing apparatus, and the information providing apparatus may be used as an information providing apparatus for medical and/or skin treatment, as described above. That is, when working with a camera image, a user may easily obtain information about surroundings by using the information providing apparatus for medical and/or skin treatment as described above to perform the work more safely and accurately. The disclosure may also be used as an information providing apparatus in various other operations using camera images.

According to the disclosure, by synthesizing photographs taken through various imaging conditions, it is possible to provide a high-definition image capable of easily identifying welding surroundings in addition to a portion adjacent to welding light.

In addition, according to an embodiment made as described above, the welding quality may be improved by providing efficient guiding to the worker regarding a current welding status.

The worker may check what is happening in the surroundings even during the welding operation. Accordingly, the worker may smoothly communicate with colleagues around him or her or may protect himself or herself from dangers from the surroundings.

Therefore, it is possible for the worker to easily perform welding even in an environment where welding is difficult.

However, the scope of the disclosure is not limited to the effect.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A welding information providing apparatus comprising:
   an automatic light-shielding cartridge;
   a main body provided to be worn by a user;
   a display unit that is configured to display a welding image to the user, wherein the display unit is configured to be arranged on the main body and, wherein the display unit comprises a portion facing the user;
   at least one camera unit configured to face an outside front of the main body and obtain the welding image frame for welding work wherein the at least one camera unit is included in a front portion of the display unit and wherein the at least one camera unit has a structure in which the automatic light-shielding cartridge is located in front of a lens of the camera unit receiving light from a subject;
   a sensor unit arranged outside the main body and comprising a module configured to detect light intensity at least within a welding area;
   an environmental management unit configured to face the outside of the main body and to obtain changing information about a welding environment; and a processor provided to operatively communicate with the display unit, the at least one camera unit, the sensor unit, and the environmental management unit, and to provide the welding image frame obtained by the at least one camera unit toward a portion facing the user of the display unit,
   wherein the processor changes a light-shielding degree of the automatic light-shielding cartridge based on the sensing information about the intensity of welding light obtained through the sensor unit;
   wherein the environmental management unit includes environmental sensing modules located on both sides and a rear surface of the main body, wherein the environmental sensing modules are camera modules;
   wherein an environmental sensing area is formed by each of the environmental sensing modules, such that the environmental sensing areas are at both sides and a rear area of the user;
   wherein the display unit provides a main screen to the user, wherein the main screen comprises the welding image frame captured with respect to a welding imaging area and wherein an environment display area is located in one area of the main screen and wherein environment images from the environmental sensing modules are displayed on the environment display area;
   wherein the environmental management unit also includes a switching unit located outside of the main body and electrically connected to the processor, such that the switching unit is configured to be capable of: simultaneously switching off all the environmental sensing modules in one operation, and sequentially switching off the environmental sensing modules on both sides and the rear surface of the main body in turn.

2. The welding information providing apparatus of claim 1,
   wherein the sensor unit comprises a module configured to detect welding information, and
   the processor is configured to control the display unit to provide guiding corresponding to the welding information based on the welding information detected through the sensor unit.

3. The welding information providing apparatus of claim 2, wherein at least a portion of the sensor unit is located on a welding torch.

4. The welding information providing apparatus of claim 3, wherein the welding information comprises at least one of welding speed information, welding direction information, welding temperature information, and information on a distance between a welding base material and the welding torch.

* * * * *